June 20, 1972   J. ROTTER   3,671,098
OPTICAL DEVICE HAVING TWO PARTS PRODUCING
FIXED INTERMEDIAL IMAGE
Filed Sept. 2, 1969   8 Sheets-Sheet 5
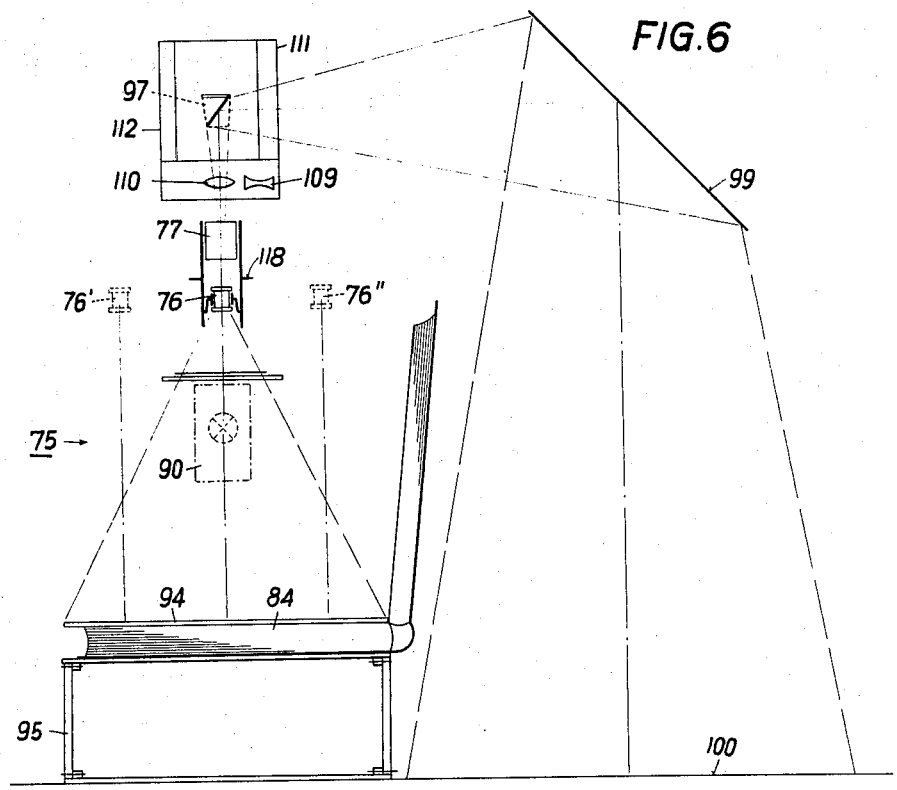
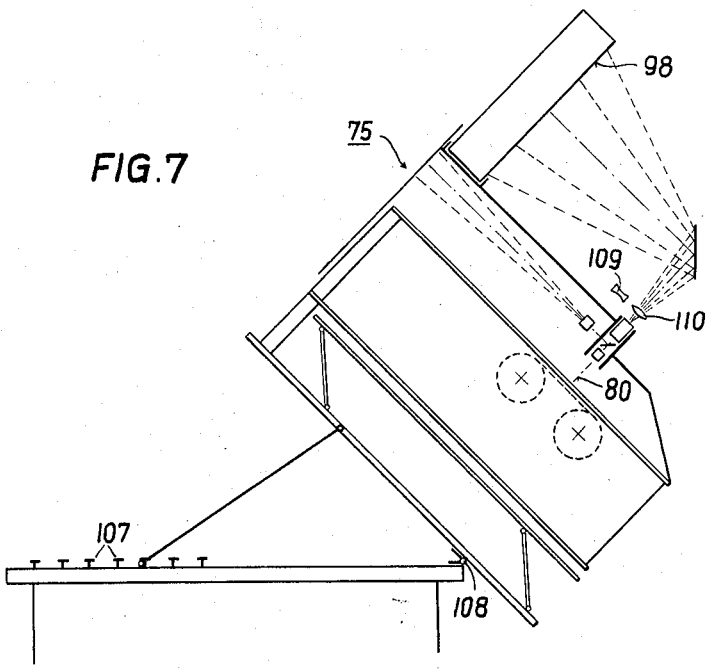
INVENTOR
JOHANN ROTTER

INVENTOR
JOHANN ROTTER

INVENTOR
JOHANN ROTTER

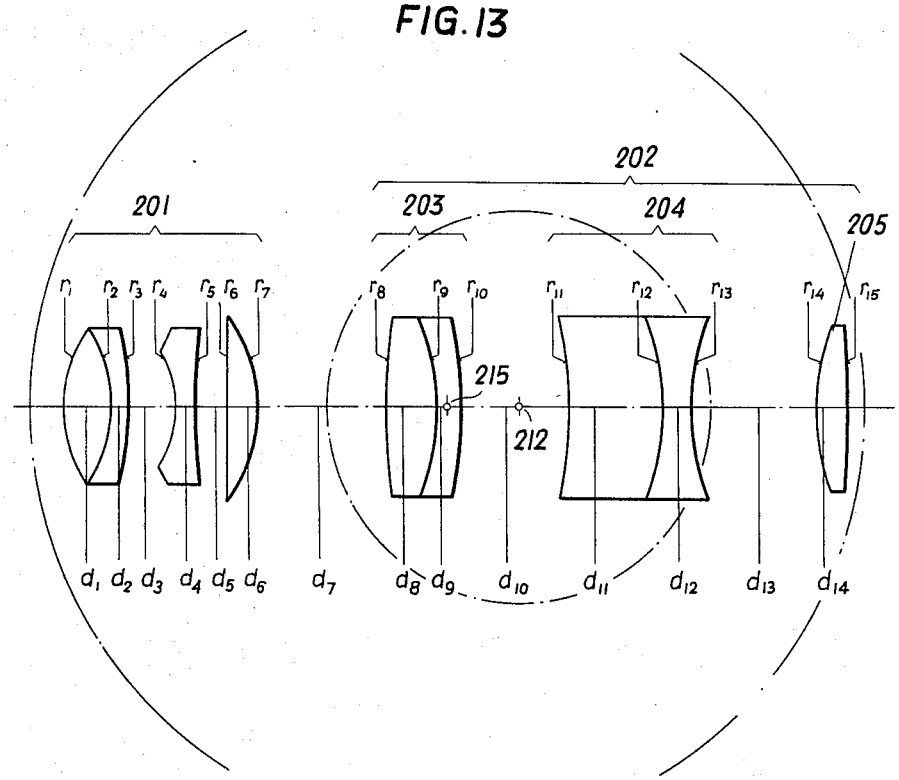
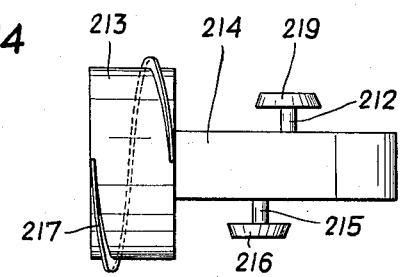
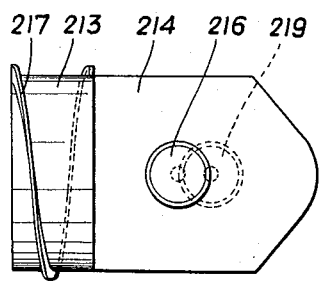

United States Patent Office 3,671,098
Patented June 20, 1972

3,671,098
OPTICAL DEVICE HAVING TWO PARTS PRODUCING FIXED INTERMEDIATE IMAGE
Johann Rotter, Ernest Thun-Str. 6, 5020 Salzburg, Austria
Filed Sept. 2, 1969, Ser. No. 854,423
Claims priority, application Germany, Sept. 4, 1968,
P 17 97 250.8
Int. Cl. G02b 21/00, 23/00
U.S. Cl. 350—8                                        12 Claims

ABSTRACT OF THE DISCLOSURE

An optical device comprising two optical parts, each of which has an image-forming member. In operation, one optical part is disposed nearer an object and the other is disposed nearer an image formed by the device, the optical parts being spaced apart so as to form a real intermediate image therebetween. The effective field diameter of one or both image-forming members is variable by alteration of at least one optical part.

---

This invention relates to optical devices.

For reproductions and viewing, there are known optical devices with two or more members, e.g., objective and ocular with real intermediate picture, monocular or binocular microscopes, and so-called working lenses, in which the objective may be changed for varying the diameter of the object field, or wherein a set of exchangeable objective lenses makes possible a change in the object field diameter without changing the distance from the object to be viewed, with the additional use of front lens attachments with change of distance.

All hitherto known devices for reproducing or viewing objects, preferably documentation materials of all kinds and more particularly flat objects, such as macrotexts, drawings, reference and index cards and microtexts, are either too limited in their performance, e.g., suitable only for reducing macrotexts or enlarging microtexts, or suitable only for transparent or only for opaque objects or microtexts, or only for extremely reduced originals or not for all usual carrier sizes or types, e.g., only for microcards, or only for film strip, only for viewing or only for reproducing individual sheets, but not for parts therefrom, and particularly not from books, only for reproductions in large size or small size, only on film, or, if a two-dimensional arrangement of micropictures is possible, only on an opaque card or only on a film, with or without the facility of inserting a capture by manual or optical photographic means. In addition, these devices are very expensive, their handling is rather complicated, their extension facilities absent or limited, or else they are not sufficiently compact and cannot, for example, be carried in a briefcase.

The invention relates to an optical device, comprising two optical parts, each having at least one reproducing optical member, e.g., objective and ocular and a real intermedial image between the optical members for reproducing originals of any kind, e.g., records, preferably flat documents, such as texts, drawings, pictures, maps, form sheets and parts of such documents, and more particularly scientific texts and groups of lines from such texts, and for the manified viewing of small originals.

The optical device according to the invention has the main object of serving the scientist and his colletcion of scientific data, preferably documentation or parts thereof, e.g., pages, groups of lines and illustrations, and all those who photograph for scientific purposes, and more particularly those who have to keep photographic reproductions of objects of all kinds, classified according to different criteria.

From the point of view of reproducing and viewing, the device according to the invention makes possible the following:

(a) The viewing and reproducing of objects of all kinds at different distances from the objective, and the projection of pictures with picture angles variable at choice in any objective position, e.g., with the use of cameras, magnifying and projection apparatus, microscopes, binoculars, telescopes, telescopic cameras, and the like;

(b) The reading of microtexts, namely those on transparent materials, as well as on paper, similar to the use of a monocular or binocular microscope;

(c) The projection of microtexts in readable magnification on the tabletop or the baseplate of the apparatus, or on a projection screen or a frosted glass plate;

(d) The remagnification of microtexts in any conventional form, even extremely reduced originals, e.g., at 1:100, of film reels, microfiches or microcards in all conventional reduction scales to a letter size which can still be read with the naked eye, and more particularly against reproduction directly on record card size foil;

(e) The reproduction of texts of conventional size on individual sheets, but also from books and periodicals, preferably in a size which can still be read with the naked eye, as well as parts of pages, and more particularly on riers, preferably on foils of index card size;

(f) The reproduction of macrotexts and microtexts of any conventional size and any conventional shape in uniform miniature size, in one or two-dimensional arrangement, both on transparent and opaque, photosensitive carriers, preferably on foils of index card size;

(g) The reproduction of an original on an index card and the recessing of the upper edge of the surface of the index card permitting the marking of the text or illustration by other means;

(h) The marking of the reproduced original, and more particularly of a text, by means of an additional, preferably successive reproduction of data characterizing the same on the same light-sensitive carrier, e.g., the bibliographical data from one or more form sheets as original;

(i) The reproduction of originals on different standardized sheets in the same or another standardized site.

According to the present invention, there is provided an optical device comprising two optical parts each of which has an image-forming member, one of which, in operation, is disposed nearer an object and the other of which, in operation, is disposed nearer an image formed by the device, said optical parts being spaced apart so as to form a real intermediate image therebetween, the effective field diameter of one or both image-forming members being variable by alteration of at least one optical part by a step or steps of $\sqrt{2}$.

The following is to be considered as such an alteration of an optical part: Alteration of focal distance by exchange of reflecting members, change of position of individual lenses of the reflecting members, attachement members, axial displacement of reflecting members.

Several embodiments of optical devices according to the invention will be explained in the following with reference to the drawing, in which:

FIG. 6 is a front elevation of the same device (viewed from the right in FIG. 5);

FIG. 7 is an overall side elevation of the "Uni-Noter" in tilted position for use;

FIG. 13 is a diagram of an optical system with objective and attachment member;

FIGS. 14 and 15 show the housing of the optical system of FIG. 13 in plan view and side elevation.

Figure 1:
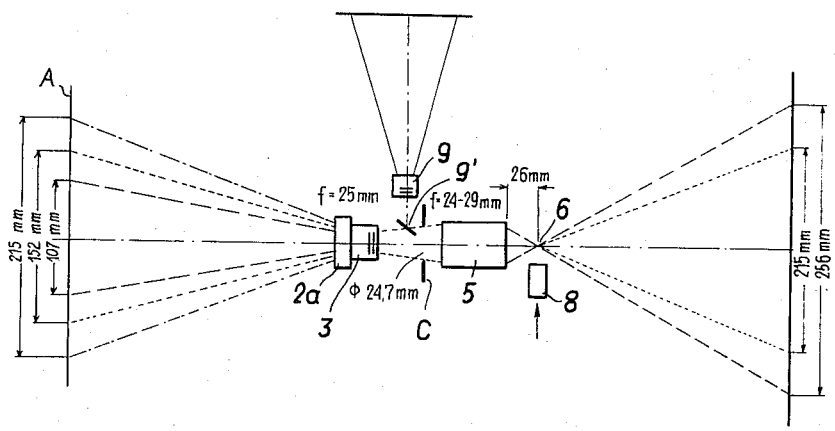
FIGS. 1 and 2 are diagrammatical views of two different optical devices.

FIG. 1 shows a diagram of an optical device comprising an objective 3 with an optical attachment 2a and a Ramsden ocular 5. The optical attachment member 2a is easily detachable and may be arranged in front of or behind the objective 3. Without the attachment, the object field has a diameter of 152 mm., with the attachment 2a, the object field diameter is increased, with the same distance of the object plane A, by a factor $\sqrt{2}$ to 215 mm., and with the attachment fitted reversely, there occurs a reduction by the same factor, i.e., to 107 mm. The objective 3 has a focus of $f=25$ mm., the diameter of the intermediate image in the intermediate image plane C is 24.7 mm. An exemplified calculation for such an objective is given further below in the description of FIGS. 13 to 15. The intermediate image plane is at a distance of 9 mm. in front of the ocular 5, having a focal width of $f=$appr. 24 mm. to 29 mm. The outlet pupil 6 has the relatively large distance of 26 mm. behind the ocular which facilitates the use of the device even for wearers of spectacles, when used, e.g., in a reading apparatus. If the optical device is used for reproductions, it is possible to increase, e.g., by introducing an ocular with variable focus 8, the picture diameter, amounting to, say, 215 mm. without the same, by a factor of 1.19 to 256 mm.

In addition to the advantages mentioned, there exists also the possibility of using a second object-side objective 9 for mirroring into the beam through a deflecting mirror 9' identifying texts or markings, which are reproduced together with the main text or picture.

Figure 2:
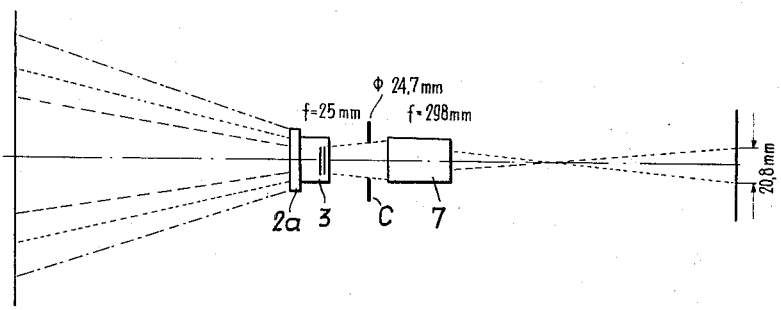

The diagram of FIG. 2 shows a very similar optical device for the serial reproduction of miniature pictures by means of deflecting mirrors, not shown. The objective 3 has the same focus and the same intermediate image plane C as in FIG. 1 and the ocular 7 with the focus $f=298$ mm. reduces the image formed by the ocular by a factor of 0.84. It has a diameter of only 20.8 mm. (instead of 215 mm. to 265 mm. according to FIG. 1).

In this embodiment, the optical device serves only for reproductions in the smallest picture sizes.

Figure 3:
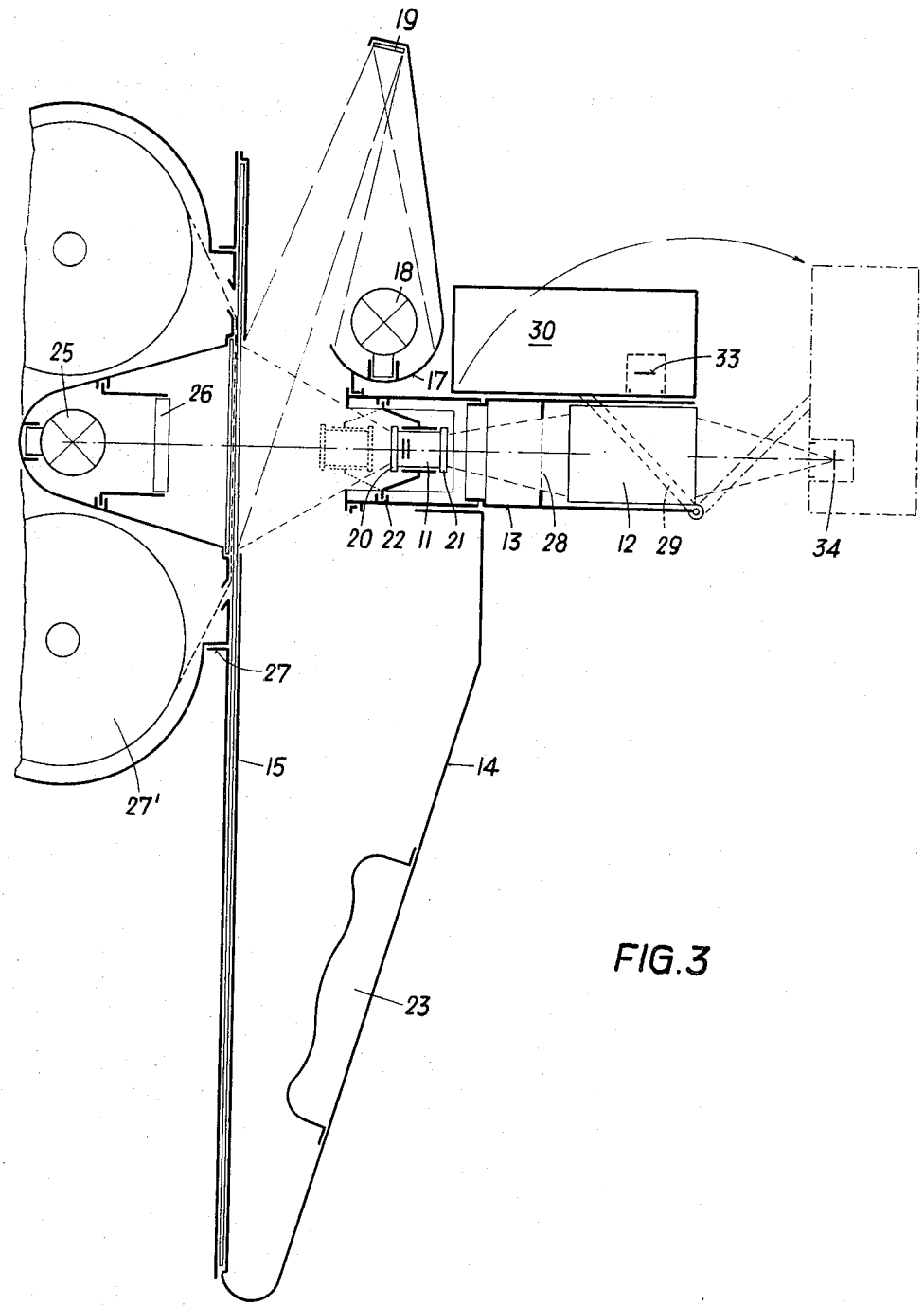
FIG. 3 is a so-called "Mini-Noter" optical device in vertical centre cross section.

The device shown in FIG. 3 serves primarily for reading microtexts and for reproducing miniature pictures in all conventional sizes in uniform miniature size, and has very small dimensions which enable it to be carried in a briefcase, so that it will be referred to herein briefly as the "Mini-Noter." It has an objective 11 and an ocular 12, fixed in a two-part cylindrical mounting 13 which is fitted to the free end of one leg of a U-shaped stirrup member 14, 15. This cylindrical holder 13 has also mounted thereon at least one reflector 17, a lamp 18 and a deflecting mirror 19, rotatable about the optical axis. The reflector 17 collects the beam in a focus, the deflecting mirror 19 deflects the beam towards the object plane of the optical device 11, 12. The objective 11 has on the front and rear sides mountings for exchangeable front or rear-mounted lenses 20, 21 or lens systems, retained, for example, magnetically and may be turned together with these from a position in which the original is reduced, into an enlarging position, shown in dotted lines, i.e., to fit it reversed into the holder 22. During this, the intermediate image plane remains unchanged. The leg 14 of the U-shaped part is provided with a handle 23. The second leg 15 carries a lamp 25, located in the optical axis, a swivellable condenser 26 and a mounting 27 for a roll film magazine 27', permitting its removal and rotation through at least 180°. The leg 15 is constructed both for pulling through the film between the rolls and for inserting film strips or flat films.

At its end adjacent to the ocular 12, the holder 13 has a swivel arm 29 for holding a miniature camera 30, adapted to be swivelled into a photographing position (dash-dot lines) in which its lens system 33 is in the output focus or pupil 34 of the ocular 12. When not in use, the camera 30 resets with its front on the cylindrical holder 13.

The optical equipment of the "Mini-Noter" is so chosen that miniature and micropictures in all conventional sizes, and parts of such pictures, can be viewed in remagnification through the ocular 12 in its virtual field of vision and can be reproduced by means of the swivellable miniature camera 30. By means of a suitable choice or adjustment of the front or rear lens attachment systems 20, 21, the object field diameter of the optical system may be aligned with the diagonals of all conventional miniature sizes, differing by the factor $\sqrt{2}$, respectively, between appr. 29.4 mm. up to about 58.8 mm., at least 54 mm., without laborious focusing. After reversing the objective 11 with its attachment lens systems 20 or 21 through 180°, also smaller object field diameters, e.g., of 20.8 to 10.4 mm. diameter may be selected, e.g., with an intermediate image diameter of, say, 24.7 mm. and with unchanged distance between object and intermediate image planes 28.

In a further embodiment, not shown, the distance between the objective 11 and the intermediate image plane 28 may be reduced, e.g., by a worm gear so that the object field diameter range becomes larger, or it may be adjusted to a second, more remote object field plane, comprehending in stages sizes varying according to the factors $\sqrt{2}$ and $0.5 \sqrt{2}$, e.g., 181 mm. to 362 mm., i.e., up to the diagonal of size DIN A4. If a correspondingly correcting intermediate lens is mounted in front of the objective, originals may be reproduced in any distance. After turning the objective through 180° and fixing it by means of a tubular mounting ring, not shown, the distance between the objective 11 and the intermediate image plane 28 may be so extended that the detectable object field diameter range is further reduced, without any change in the distance between intermediate field plane 28 and the second object plane, wherein again several sizes, differing by the same $\sqrt{2}$ factors may be detected in the range from about 1.59 mm. to 3.38 mm.

Preferably, the optical system is so calculated that the diameter of the real intermediate image is between 15 mm. and 35 mm. and preferably 24.7 mm. This value is the geometrical mean of the object field diameter of 41.6 mm. with reducing effect and 14.7 mm. with enlarging effect of the objective without attachment members. In connection with attachment members according to the invention, in this position of the objective and with constant distance between object and intermediate image plane, all conventional small sizes (52 mm. x 45 mm., 24 mm. x 36 mm., 18 mm. x 24 mm., 12 mm. x 17 mm., 8 mm. x 11 mm.), filling the object field and the viewing field exactly or at least substantially, can be reproduced. If the interediate image diameter is larger than 24.7 and more particularly larger than 35 mm., also the focal length of the objective must be larger; the larger is the distance between the object and intermediate image planes, the less handy the apparatus becomes, and the more difficult it is to adapt the apparatus for the reproduction of originals in the normal paper sizes, e.g., 210 mm. x 297 mm., as well as texts in microfilm size, e.g., about 12 mm. x 17 mm., such as are usual for microfiches. If the intermediate image diameter is smaller than 24.7 mm., and more particularly smaller than 15 mm., the ocular must magnify more than is comfortable for the viewer, if the lettering is still to be easily readable in his field of vision. In addition, this also requires a much more complex and expensive objective according to the invention. For this reason, the optimum is at 24.7 mm., because this is also the geometrical mean of two very common miniature diagonals, namely 29.4 and 20.8. However, the focus of the objective is also limited towards the bottom. Below a focus of 15 mm., there are greater difficulties with the construction of the ocular and, due to excessively short distances between the object plane and the objective, difficulties with vertical illumination and in the construction of the remaining parts of the apparatus, where large magnifications are demanded.

The ocular 12 is preferably a Ramsden ocular with a focus of at least 19 mm., preferably 24 mm to 29 mm., wherein the distance of the output pupil 34 of the optical device 11, 12 from the eyeside member of the rear lens of the ocular is at least 15 mm., and preferably about 26 mm. With these dimensions, the ocular may be used also directly by wearers of spectacles. In addition, this is also advantageous for solving reproduction and construction problems in the further construction of the apparatus (see Line-Noter, Uni-Noter).

Preferably, the ocular 12 is also axially adjustable (not shown in the drawing). This makes the Mini-Noter, as well as the additional construction stages of the multistage optical equipment, suitable both for viewing objects in the vertiual image, and for a remagnifying projection and reproduction of microtexts, e.g., via a deflecting mirror 71 (FIG. 4) onto a tabletop. The focus selected for the objective and for the ocular and the size found to be suitable for the intermediate image diameter of the pocket reader offer a suitable reading distance and make the apparatus easy to handle.

The mounting for flat and strip-shaped originals— rotatable and detachable for roll films—and the wide overhang of the retaining clip 15 are suitable for all known microfiche sizes up to about 38 cm. x 38 cm., for film strips and roll films of the conventional sizes, lengths and widths and satisfies every, even a changing picture position in the carrier. The engageable and disengageable condenser 26 meets the changing requirements of an illumination of varying object field diameters under transillumination. The vertical illumination, rotatable about the optical axis avoids inconvenience to the viewer by heat rising from the light sources and renders the Mini-Noter easily transportable by swivelling into the space between the legs 14 and 15. The light beam of a vertical light source, which is narrowed down to a very small diameter by the collector device 17 permits the use of very small, light and cheap additional elements which turn about the axis and can be easily exchanged, for scattering, collecting, filtering and deflecting. The narrowing and deflecting of the light beam permits even the illumination of large object field diameters which require light sources at great distance, without rendering the apparatus unwieldy and improve its adaptability.

Due to the swivellable mounting 29 of the miniature camera 30, the same may be permanently mounted thereon without substantially impairing the handiness of the Mini-Noter.

Figure 4:
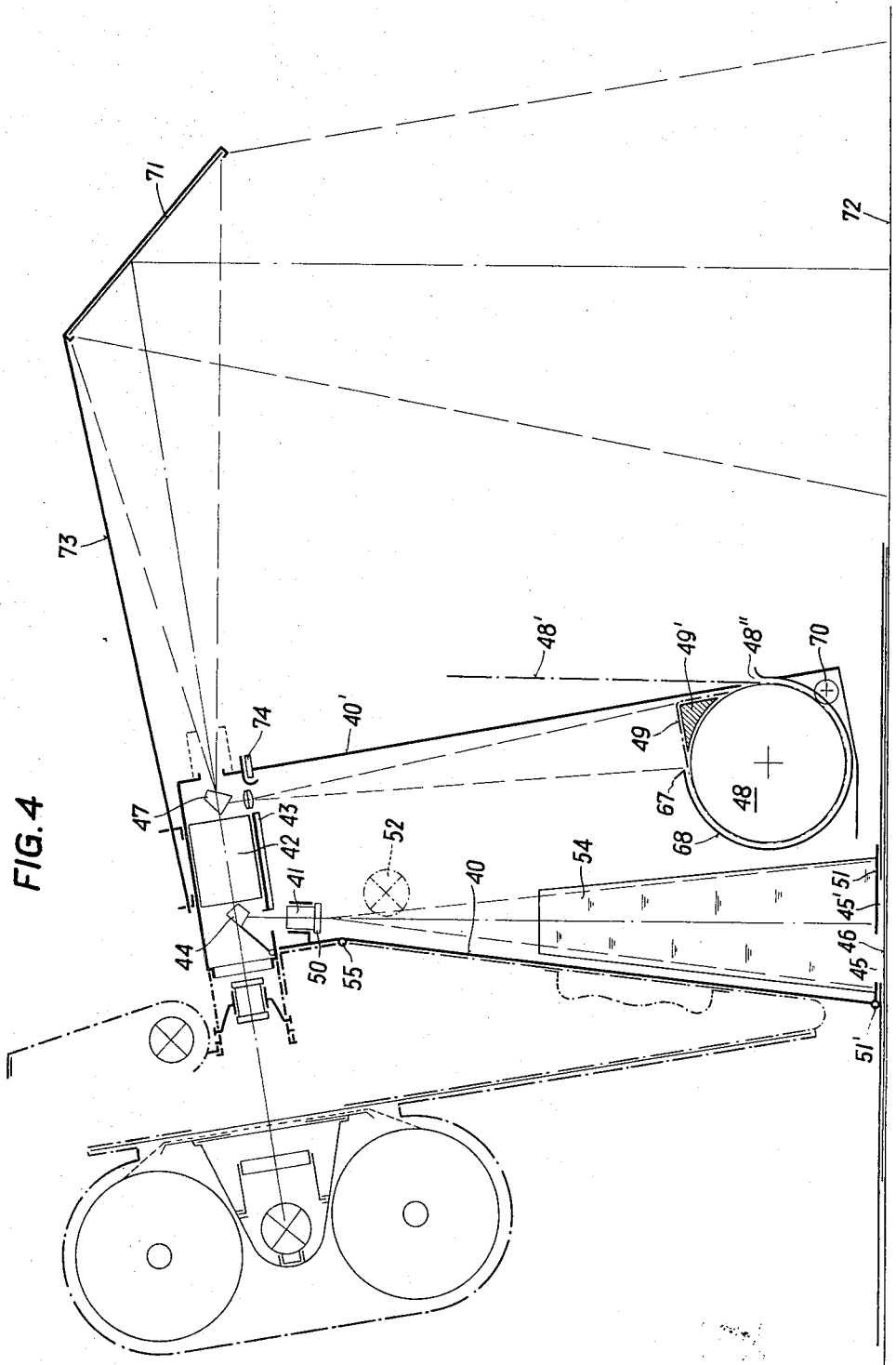
FIG. 4 is an optical device, a so-called "Line-Motor" in vertical cross section, with a "Mini-Noter" as attachment, shown in chain-dotted lines.

FIG. 4 shows a further structural stage of the optical device according to the invention, intended mainly for reproducing and marking groups of lines in natural size, and briefly designated "Line-Noter"; it can also be used as stand for a Mini-Noter (FIG. 3), in which the ocular has been dismantled and may then be used at choice for the enlarging reproduction of groups of lines from microtexts.

The upper part of a housing 40 contains a compound optical system with an objective 41 and an ocular 42 in a common mounting 43, wherein the optical axes form an obtuse angle. Behind the objective 41, a disengageable system of mirror surfaces, e.g., a roof-angle prism 44, deflects the beam coming from a window 45 from the direction of the object plane 46 of the Line-Noter, which is usually also its base plane, towards the ocular 42. Behind the same is a second system of mirror surfaces, e.g., a pentagon prism 47 with a roof edge according to Gautier, which deflects the beam again in the direction of the base plane 46, in front of which it intersects a reproduction plane 49. Between this reproduction plane and the base plane 46, there is a roll 48 of light-sensitive, preferably electrolytic paper, equipped with a transport mechanism and running over a guide 49', where it is exposed and transported by the roll 48 to the delivery at 48". The window 45 (e.g., 148 mm. x 35 mm.), located in the bottom of the housing 40 in the base plane 46 coincides in its dimensional relations with the dimensions of the image field defined on the light-sensitive paper 48 in the image plane 49 and measuring, e.g., 148 mm x 35 mm. The window 45 is mounted in a frame 51 swivellable about an axis 51'. When the frame 51 is raised about the axis 51', an object field section 45', increased by a factor of $\sqrt{2}$ is opened and is scanned by an objective comprising a system of attachment lenses according to the invention. A text located directly under the window in the object plane 46 of the objective 41 is illuminated by two laterally mounted top illumination sources 52 with reflector (see also parts 17 to 19 in FIG. 3 and parts 105 in FIG. 5) and reflecting mirrors 54 mounted on both sides (see also FIG. 5, parts 106, 106'). For checking the correct adjustment in the virtual image of the ocular 42, the user swivels aside the roof-edge pentagon prism 47 located in the beam path behind the eye lens of the ocular 42. The obtuse angle between the optical axes of the objective 42 and the ocular 41 and the deflection at an acute angle by means of the roof-edge prism 44 enable a seated viewer to look into the ocular 42. The roof-edge pentagon prism 47 causes, after reintroduction into the beam, the reproduction in the image plane 49, containing the light-sensitive paper 48. The exposure time is controlled, preferably electronically by an exposure meter. For making a recording, the Line-Noter 40 is placed on the original to be reproduced, e.g., a form sheet, preferably on two combined form sheets (see also FIG. 5, parts 60 and 60'). After this exposure, the roll of paper is advanced one step (35 mm.) and the Line-Noter is placed on the group of lines, associated with the entry into the form sheet, of a column of the scientific report, followed, in the case of a longer text, by the next group of lines. Afer every two to three or six exposures, and three or six steps of always 35 mm., the strip of light-sensitive paper is cut by a cutter (only indicated) at the housing 68 of the paper reel 48, and the exposed section of light-sensitive paper 48' is pulled or pushed out after its sensitive layer has been treated with fixing solution, e.g., by being run over a saturated sponge strip 70. The resulting photograph has a width of 148 mm. and a length after three steps of 35 mm. each=105 mm., i.e., the dimension normal for index cards DIN A6 oblong. Thus, it is possible to photograph with this device, e.g., successively from an original, such as a form sheet, the data identifying a scientific report from an index card, and then, from the report itself one or two groups of lines, and has then on one index card size sheet in the size DIN A6 oblong, both the identification and the group lines. Every photograph is immediately available, its quality may be checked, it is durable and its size fits the research index of the scientist.

With opened frame 51 and therefore wider window 45', line groups up to a width of 210 mm. may be reproduced under simultaneous extension of the object field diameter of the objective 41 by means of the lens attachment system 50.

For reproducing groups of lines from microtexts, the Mini-Noter of FIG. 3 is placed on the Line-Noter 40, serving as stand, as shown by chain-dotted lines in FIG. 4, after the ocular 12 of the Mini-Noter with its holder have been removed and the mirror system 44 has been swivelled out of the way. If the mirror systems 44 and 47 are swivelled out, the line groups of the microtext may be read in enlargement and can then also be reproduced in magnification by means of the mirror system 47 on the light-sensitive paper of the Line-Noter.

A more comfortable reading of microtexts is possible by combination with the Mini-Noter by means of an attachment. This attachment consists of an arm 73 adapted to be fitted to the housing 40, carrying a deflecting mirror 71 and projecting the texts to be read onto the plate 72 of the working table. In order to facilitate transportation of the Line-Noter, the wall portion 40' of the housing with the ocular 42 and the housing 68 of the paper reel 48 are adapted to be swivelled about an axis 55 into the space between the mirrors 54. In the folded-in position the Line-Noter has then, without the arm 73, the shape of a flat box measuring about 20 x 30 x 5 cm.

Figure 5:
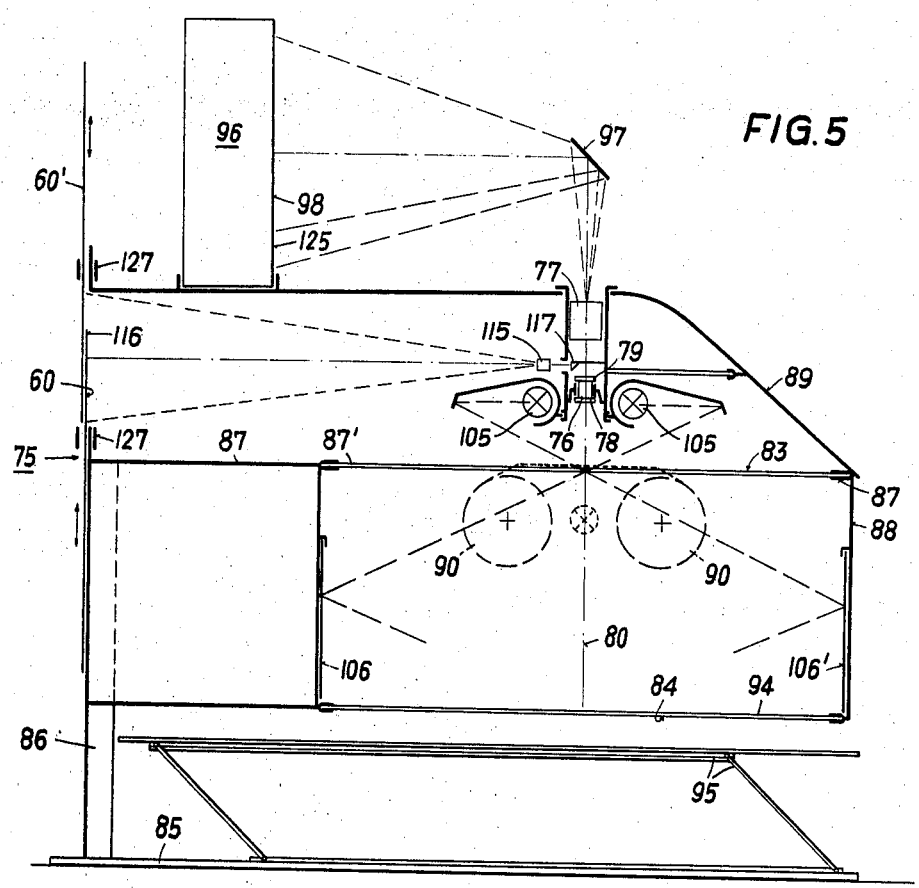
FIG. 5 is a "Uni-Noter" optical device in diagrammatical, vertical cross section.

A further stage of the optical device according to the invention, according to FIGS. 5 to 7, is formed by a universal reproducing device, called briefly the "Uni-Noter," which is suitable for reproducing macrotexts and microtexts of any normal size in a letter size which can be read with the naked eye, using one and the same optical device for viewing microtexts in remagnification, projecting preferably transparent microtexts, and for providing, in a further embodiment, reproductions with identifying texts. Preferably, the reproductions are made on nontransparent paper, e.g., paper size 105 mm. x 148 mm., or 148 mm. x 210 mm., or in an embodiment for subminiature series also on transparent carriers, e.g., on film in index card size, e.g., 105 mm. x 148 mm., called briefly microfiche.

The Uni-Noter, shown generally at 75, has, in the same way as the Mini-Noter of FIG. 3, an objective 76 and an ocular 77, the objective being equipped with front attachment lens system 78 and a rear attachment lens system 79, and having its optical axis 80 perpendicularly to the base plane. The objective 76 may be adjusted to an object plate 83 for microtexts with an object field diameter range of about 10.7 mm. to 58.8 mm., and by means of an axial adjustment also to an object plane 84 for macrotexts with an object field diameter range from about 181 mm. to about 362 mm. The optical equipment 76 to 79 is mounted on a frame 85 to 89. This frame consists of a baseplate 85, having on one side a column 86, extending to the level of the object plane 83 for microtexts, and having at its upper end a supporting arm 87, projecting above the baseplate 85 and facing the viewer, and having in the zone of the optical axis a window 87', preferably a glass plate, in the zone of which the object plane is located. The front end of the support arm 87 is forked to form two prongs 88, 89. The arm 87 is equipped with a device for holding a microfilm reel magazine 90. The prong 88 extends downwardly to the level 84 for macrotexts, where it located the edge of a rectangular glass plate 94, mounted parallel to the baseplate 85 and measuring about 210 mm. x 366 mm., and the underside of which coincides with the second object plane 84. Between the baseplate 85 and the glass plate 94, there is a book stand 95, whereby an open book (FIG. 6) may be pressed with the side to be reproduced (up to 220 mm. x 330 mm.) from the bottom against the glass plate 94. The second fork 89 extends upwardly and rearwardly to just above the column 86. It carries the optical equipment, comprising the objective 76, optical attachments 78 or 79, respectively, the ocular 77 and a reproduction device 96, equipped for different recording media, and preferably for fixation development of electrolytic paper, which is reeled off a reel, developed, fixed and torn off after the exposure. For the picture carrier, at least two sizes, 148 mm. x 210 mm. (DIN A5 upright) and 148 mm. x 105 mm. (DIN A6 oblong) may selected.

A deflecting mirror 97, rotatable about the vertical optical axis 80, deflects in accordance with its position the beam coming from the ocular 77 either away from the user towards the vertical reproduction plane 98 on the device 96, as shown in FIG. 5 or via a second deflecting mirror 99 (FIG. 6) onto a projection plate 100 adjacent to the baseplate of the Uni-Noter, e.g., the tabletop of the working table. The deflecting mirror 97 is swivel-mounted.

The same illuminating device as in the Mini-Noter of FIG. 3 is available for incident and transillumination. The incident illumination serves both for microobjects in the plane 83 and for macroobjects in the plane 84. The light beams coming from the two incident light sources 105 and intersecting in the microplane, are deflected by two mirrors 106, 106' mounted substantially perpendicularly at opposite sides of the plass plate 94 towards the base point of the optical axis 80 in the object plane 84, so that the same is uniformly illuminated. The exposure is controlled by an electronic light metering device. Such an illumination, flowing parallel to the freely accessible pair of edges of the glass plate 94 via the deflecting mirrors 106, 106', enables the apparatus to be constructed in a more compact manner. This facilitates the reproduction of individual pages of a book, because otherwise the operator, especially when seated (FIG. 7), and the light source would obstruct each other.

The microfilm reels 90 can be displaced in their holder in the direction across the support arm 87 so that they do not obstruct the light flux for incident illumination and for the reproduction of macrotexts.

The Uni-Noter can be inclined as a whole into a tilted position of its optical axis 80 (FIG. 9), i.e., into a position convenient for viewing from the seated position and can be fixed by means of a device 107, also tilted about the edge 108 of the working table.

For changing over from the setting for the microobject plane 83 to the macroobject plane 84, the objective is simply moved from one limit to the other. For varying the object field diameter between about 181 mm. and 362 mm. (in three steps), the front and rear lens attachments are used, shown at 78 and 79, respectively. The provision of a common incident illumination arrangement for both object planes permits a simple operation of the device and a compact construction. The intersection of the light flux of the incident illumination in the plane for microobjects 83 makes it possible to make do with a minimum of incident light sources 105. The glass plate 94, located about 100 mm. above the basplate 85, the book holder 95, the setting of all microtexts, including books in the open state, by pressing them from below against the glass plate 94, facilitate the turning of the leaves, the locating and adjustment of text passages for a reproduction. The tiltability of the apparatus (FIG. 7) permits their use on high or low tables and by large or short viewers, particularly in the sealed position. This is further supported by angling the beam by means of the mirror 97 in the direction of the main column and its swivel mounting. Otherwise, it would not be possible to move the eye near the ocular 77, for checking the sharp focusing and the definition of the object field. The size of the picture carrier DIN A5 upright, available from two sizes, permits reproductions readable with the naked eye of whole periodicals and pages of books on index card size, whilst faulty exposure is prevented even with different originals by the electronically controlled light-metering exposure.

Recordings on electrolytic paper require little manipulation, are very cheap and are immediately available. The recommended sheet size is the same as the usually used size for index cards (DIN A5 upright), and, if a recording fails, it can immediately be repeated. In one embodiment (FIG. 6), the camera leaves out sufficient space along the upper edge of the sheet that the copy can be marked by hand or hectographically.

In yet another embodiment, the focus of the ocular may be varied, either by axial displacement of at least one of its members, or by selectively mounted scattering lenses (FIGS. 6, 7) or collectors. In this way, it is possible to produce, with constant path between the ocular 76 and the reproduction plane 98 and without loss in picture definition, changes in the size of the obtained reproduction 111 or 112, respectively, e.g., from 123 mm. x 175 mm. (upright) to 148 mm. x 210 mm. (upright).

Figure 8:
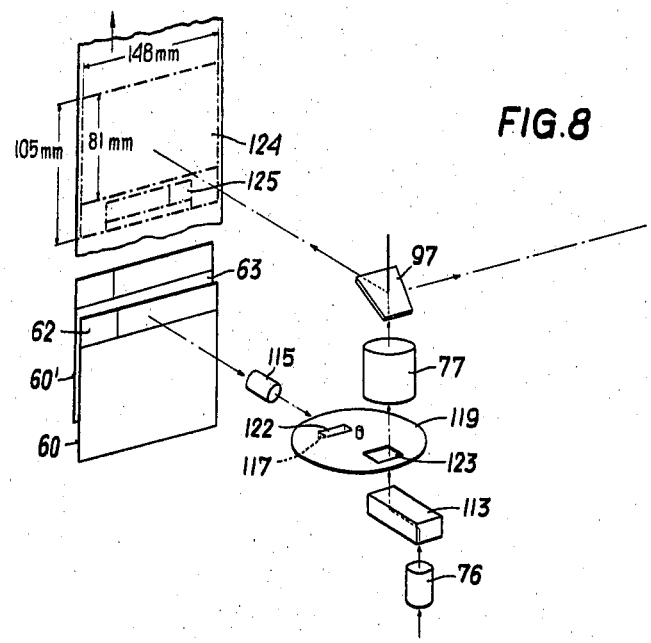
FIG. 8 is a diagram of a detail of the optical equipment for a "Uni-Noter" according to FIGS. 5 to 7.

In the embodiment of the Uni-Noter optical device, shown in FIGS. 5 and 8, the image supplied by the objective 76 and coming from the object planes 83 or 84, can be combined on the same photosensitive carrier with a partial image applied from the side of the column, e.g., of two combined forms 60, 60'. To this end, the apparatus has a second objective 115 with an object plane 116, located perpendicularly to the base plane, in which two form sheets 60, 60' may be mounted in mutually displaced positions in guides 127 (FIGS. 5 and 8). The beam coming from these adjacent partial fields 62 and 63 of the form sheets as original, is deflected behind the second objective lens 115 through a prism 117 rotatable by the mask 119, to the ocular 77 and reaches, accompanying the beam coming from the first objective 76, the reproduction plane 98. The data entered in the partial panel 62 of the index part 60 identify, for example, a book, the data in the panel 63 of the index card 60' a certain passage in the book.

As may be seen from the diagram of FIG. 8, this comprises a diagrammatically indicated system of mirrors 113, located between the objective 76 and the ocular 77, for straightening the image, and the said rotatable mask 119 with two openings 122, 123. This mask 119 serves for correctly combining in the reproduction plane 98 (FIG. 5) the pictures coming successively from the objectives 76 and 115. The prism 117 is fitted immediately in front of the mask opening 122 and may be swivelled into the path to the ocular 77 together therewith. The combined picture of the two beams on the light-sensitive carrier has a maximum size of 105 mm. x 148 mm. and consists of a partial panel 124 with maximum dimensions 81 mm. x 148 mm. (oblong), corresponding to the opening 123 in the mask and coming from the first objective 76, and a second partial panel 125 (corresponding to the opening 122) of maximum size 24 mm. x 148 mm. (oblong), coming from the second objective 115 and containing the identifying data.

In a further embodiment, the Uni-Noter 75 has two relatively laterally displaceable parts. One part, the upper part, is associated with a compound equipment 76 and 77, the second optical equipment 115 with its mounting 127 (FIG. 5) for the form sheets 60, 60', the incident illuminating sources 105 and the reproducing equipment 96; the second part comprises the baseplate 85, the column 86 with support arm 87 and prongs 88, 89 and the mountings for microtexts and macrotexts 90, and 94, 95, respectively. If the upper part of the Uni-Noter is displaceable laterally relative to its lower part, as shown in FIG. 6 by the dash-dot objective lens systems 76' and 76", it is easy to reproduce a group of lines near the fold of an open book under the glass plate 94 by shifting the upper part with the optical equipment and acessories relative to the lower part.

The reversal of the image by the mirror system 113 (FIG. 8) permits it to check the correct setting of an opened page of a book, particularly where only a group of lines or an illustration is to be reproduced, by means of the ocular 77, without having to place the book upside down under the glass plate 94 or to view the text in the ocular 77 in upside-down position.

The possibility of changing the size of the reproduction by means of scattering or collecting lenses 109 and 110, respectively (FIG. 6 and FIG. 7), eliminates the necessity of changing the ocular 77 for a change from the reproduction of whole pages to that of groups of lines. Otherwise, it would be necessary to use, for the reproduction of whole pages, an ocular with a magnification which would be too high for comfort.

Figure 10:
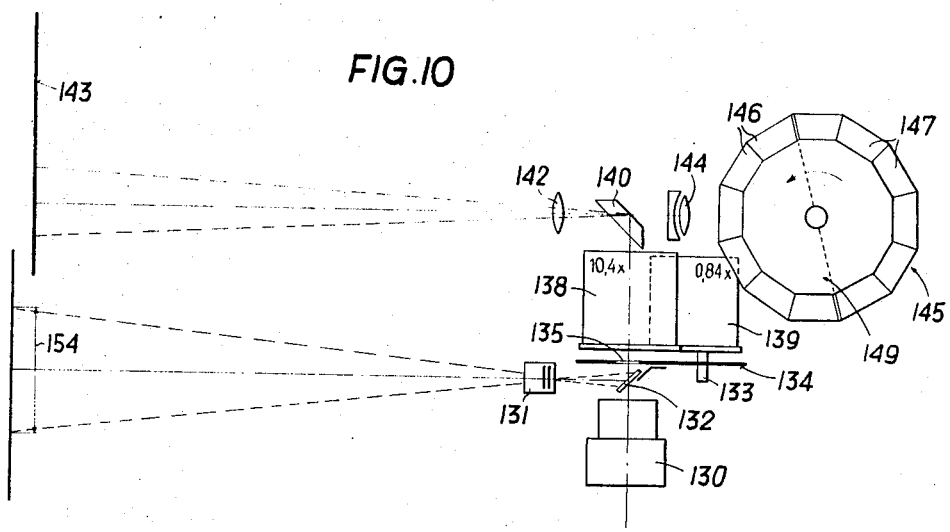
FIG. 10 is a side elevation thereof.
Figure 9:
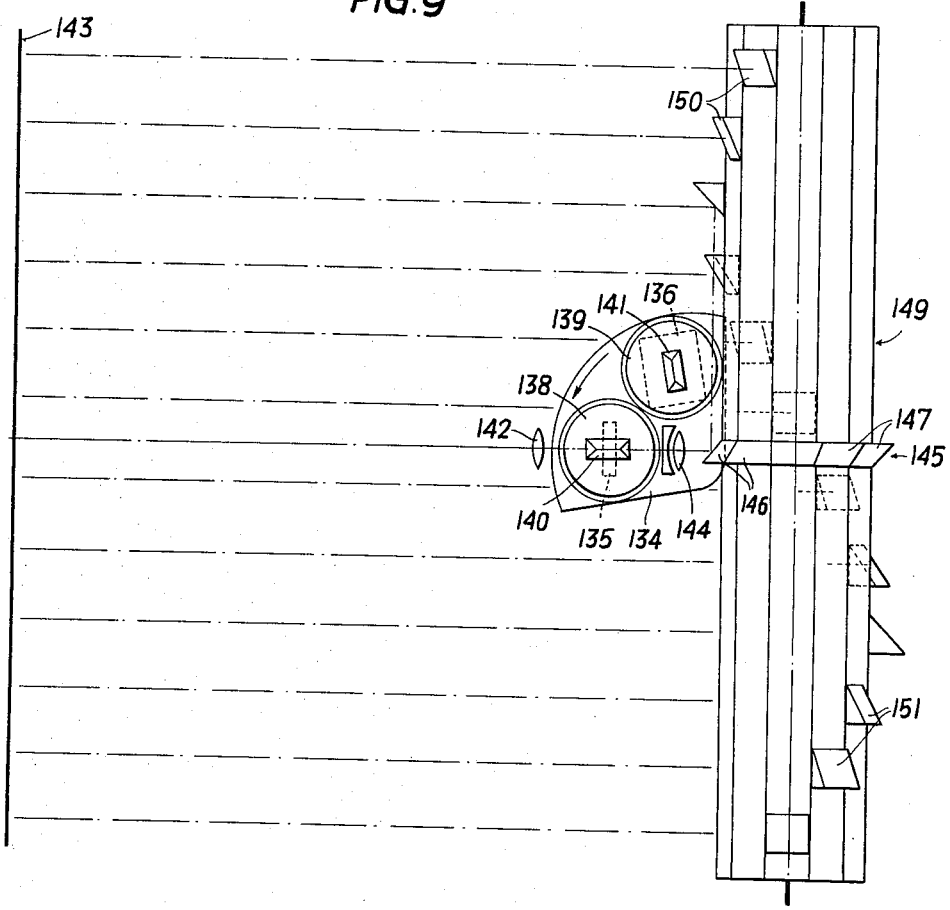
FIG. 9 is a diagrammatical plan view of a further optical arrangement, suitable for a "Uni-Noter" and for a "Screen-Noter" and used for the reproduction of micropictures.
Figures 11, 12:
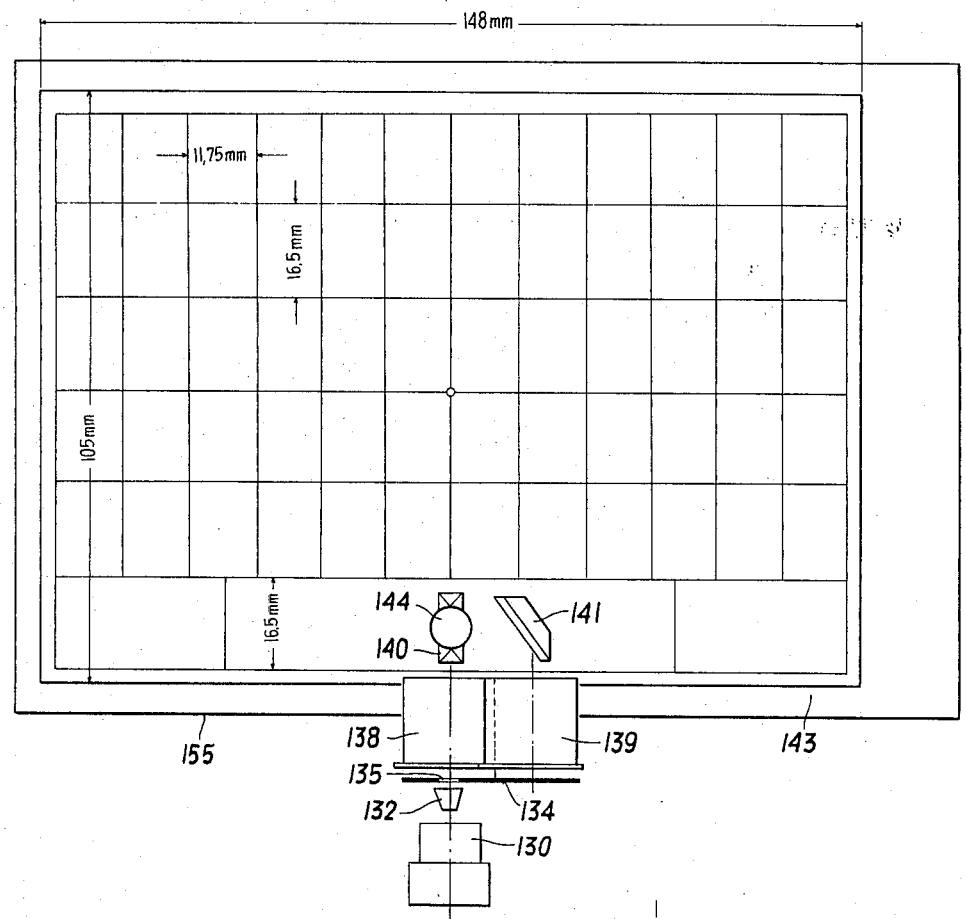
FIG. 11 is a front elevation, viewed from the right in FIG. 9, with a microfiche produced with the device of FIG. 9.
FIG. 12 is a diagrammatical view of a further optical device for the reproduction of microputines equipment for a "Uni-Noter" device.

In another embodiment according to FIGS. 9, 10 and 11, suitable as attachment for the Uni-Noter, the optical equipment supplies also two-dimensional serialization of subminiature pictures in maximum size 11.75 mm. x 16.5 mm. in an area of 148 mm. x 105 mm., including an identification.

The equipment, shown merely schematically in FIGS. 9, 10 and 11, has an objective 130, a further objective 131 whose optical axis forms a right angle with that of the objective 130, a swivel-mounted deflecting mirror 132, a mask 134 swivellable about an axis 133 and having a slot-shaped window 135 and a larger window 136, two oculars 138 and 139 which may have swivelled together with the mask 134 about the axis 133 in order to align them at choice with the beam coming from the objective 130 or 131. The ocular 138 has a magnification of 10.4 and the ocular 139 of 0.84. Each ocular is connected with a roof-edge prism 140 and 141, respectively. The prism 140 deflects the beam from the ocular 138 through a correcting lens 142 towards the image plane 143. The prism 141 on the other hand deflects the beam in the optical axis in the opposite direction, when the ocular 139 is engaged. The beam then passes through an optical correcting member 144, consisting, e.g., of a fixed and an axially adjustable lens, to a bevel-edged wheel 145 having along its periphery in one-half six reflecting bevels 146 which deflect the beam towards the left through 90°, and in the other half six bevels 147, which deflect towards the right through 90°. The bevel-edged wheel 145 is mounted on a hexagon shaft 149, carrying on both sides of the bevel-edged wheel six mirrors or prisms 150, 151 which are off-set spirally relative to each other so that, during the rotation of the shaft through always 30°, the beam impinges always on the next mirror 150 or 151 where it is always deflected in the same plane through 90° towards the image plane 143, where the pictures focused thereon are placed in linear series.

The device is used as follows:

First the text identifying a group of miniature pictures is written into the panel 154 (FIG. 10), of a suitably dimensioned sheet (e.g., 125 mm. x 25.5 mm.), and is then reproduced through the objective 131 and the deflecting mirror 132, through the window 135 in the mask 134, having the correct dimensions, and via the ocular 138 (magnification ×10.4), the roof-edge prism 140 and the optical member 142 correcting the path from the ocular to the image plane, on a flat film in a photographic magazine 155 (FIG. 11) in the image plane 143. Then the magazine is lowered by the height of the picture, e.g., by a maximum of 16.5 mm. and simultaneously, the deflecting mirror 132, the window 135 of the mask 134, the ocular 138 and the prism 140 are replaced by swivelling by the other window 136 of the mask 134, the ocular 139 (magnification ×0.84) and the roof-edge prism 141. The beam coming from the object field (not shown) of the objective 130, containing an original, e.g., 210 mm. x 297 mm. upright (not shown), passes then through the first objective 130, the ocular 139, the roof-edge prism 141, the optical correcting member 144 and a bevel 146 or 147 to the associated mirror 150 or 151, respectively, which deflects it towards the image plane 143 where it reproduces the picture of the original in miniature size, e.g., maximum 11.75 mm. x 16.5 mm. Then a new original is placed into the object plane, the movable lens of the optical correcting member 144 is automatically adjusted for compensating the changed path length from the ocular 139 to the image plane 143, the shaft 149 rotates through 30° and the beam produces in the image plane, in parallel displacement to the first picture, a second miniature picture, and so on, until the whole row of twelve miniatures is complete. Then the magazine drops by the height of this row of pictures and the next row of pictures is produced above the first row, until all five rows are completed. Then the magazine is changed and the process starts again with the identification of the next film sheet.

By means of this apparatus, the user can not only store pages of text in a very space-saving, handy and easy form, but the apparatus also enables him to transform a plurality of sizes and shapes of picture carriers, e.g., roll films, film strips, microcards, etc., into microfiches of uniform shape, and to identify them uniformly and sufficiently.

The bevel wheel 145 may also be replaced by a single mirror surface, rotatable through 180° about the axis of the beam or by a roof-type prism displaceable transversely of the axis. The correction of the different paths during the serialization of the miniature photographs may be effected, instead of by an axially displaceable lens of the optical correcting member 144, by an eccentric shaft coupled with the shaft 149 carrying the deflecting mirrors 150, 151, which raises and lowers the ocular 139 as required in the axial direction. This saves the optical correcting member 144, simplifies the mechanical structure and improves the possibilities of further attachments.

For correcting the picture size and focusing from different paths from the ×0.84 ocular to the image plane it is also possible to use a linearly arranged row of correcting lenses located between the mirror roller and the image plane and parallel thereto. Every mirror of the roller is associated with another correcting lens. Either a separate lens is designed for every path and all lenses are equidistantly spaced from the image plane, or identical lenses are mounted at different distances from the image plane. Both solutions simplify the mechanics and the operation and reduces the possibility of faults of the apparatus or of the attachment.

Yet another embodiment according to FIG. 12, of an optical device for the two-dimensional serialization of micropictures with simultaneous identification, suitable for use both for the Uni-Noter and for the Screen-Noter contains the two objectives 130 and 131, the rotatable mask 134, the deflecting mirror 132 mounted thereon, and the two selectably mounted oculars 138, 139 with magnification factors 10.4 and 0.84, respectively, in the same way as described with reference to the device illustrated in FIGS. 9 to 11.

However, here the beam is not deflected at a right angle, but falls directly on the deflecting mirrors 260, 261, mounted on a shaft 262, rotatable about an axis 263, parallel to the optical axis of the oculars 138, 139. The five deflecting mirrors 260 are mounted on a spiral on the upper pentagonal part of the shaft 262 so that after a rotation of the shaft through 72° always another, axially offset, mirror, is placed into the optical axis. In the reproduction plane, there is the recording film 265 which is pulled off a film reel 266, the axis of which is parallel to the axis of the oculars. On this film 265, five small pictures, measuring 11.75 x 16.5 mm. are successively projected in upright position one on top of the other by means of the ocular 139, whilst the shaft 262 rotates in steps. After one such column of five superimposed micropictures has been completed, the film is transposed by the width of the size of the micropicture (11.75 mm.) and the serialization of the pictures is continued until twelve columns, each of five pictures, that is to say, sixty pictures, have been recorded on the film, as shown in FIG. 11. There remains then of the desired finalsize of 105 x 148 mm., apart from a narrow strip at the bottom, a panel of a height of 16.5 mm., which is used for providing the identification; to this end, after completing the first six of the twelve columns, the ocular 138 is engaged and the mirror 261 is rotated into the optical axis so that the bottom panel can be provided with the identification, as indicated by chain-dotted lines in FIG. 12. This arrangement also comprises, for compensating the different paths from the ocular to the image plane 265, the same correcting devices, as already described with reference to FIGS. 9 to 11, but these have been omitted in this figure in order to cimplify the drawing. As correcting members, the following may be used: the whole ocular, individual lenses thereof, or lenses located between the ocular and the image plane, which are axially displaceable, or exchangeable optical members.

According to a further embodiment of the Uni-Noter, the magazine of the reproducing section is movable without incidence of light through 17.5 mm. transversely to the optical axis in the direction of the upright size 148 mm. x 210 mm. With simultaneous reduction of the reproduction scale from 10.4 to 8.7, e.g., by means of a Vario-ocular, there remains along the upper edge of the picture a free strip for the subsequent, e.g., manual identification, or by hectographic means, in normal size lettering.

For indentifying two-dimensional serialized microfiches, the magazine is moved without incidence of light several times in the same direction and preferably by the same amount and series of exposures is made after every movement. This makes possible the series production of exposures, in one direction by mechanical and in the other direction by optical means.

In another embodiment of the invention of the Uni-Noter, the magnification of the ocular is variable by means of axially displaceable lenses as known per se, e.g., in the range between 8.7× and 10.4×. This makes it possible to vary the size of the reproduction of the optical device at choice with constant travel between ocular and image plane and to copy originals in sizes DIN A5 upright and DIN A6 ablong also at the scale of 1:1, e.g., to copy index cards of these sizes by optical means.

In another embodiment, all lenses through which the beam passes to the reproduction plane 98, are made of quartz, synthetic quartz or other crystals passing along or short waves and make possible ultraviolet illumination and enable copies to be made on UV sensitive carriers, e.g., blueprint paper.

The optical system shown in FIGS. 13 to 15, which may be used, for example, for an arrangement according to FIG. 1 (parts 2a and 3), has an objective, shown generally at 201 and an attachment member, shown generally at 202 and consisting of two lens groups 203, 204 and a single lens 205.

The objective 201 consists of four lenses, the lens groups 203 and 204 with two lenses each. The radii of curvature $r_1$ to $r_{15}$ and the axial distances $d_1$ to $d_{14}$ of the lenses, as well as the indices of refraction and the associated Abbe numbers of the individual lenses or lens surface are shown in the following table:

| Radius of curvature, mm. | Distance, mm. | Index of refraction | Abbé number |
|---|---|---|---|
| $r_1 = +12.7$ | | | |
| | $d_1 = 2.6$ | $nd = 1.6563$ | $v = 57.29$ |
| $r_2 = -7.91$ | | | |
| | $d_2 = 0.8$ | $nd = 1.5638$ | $v = 60.76$ |
| $r_3 = -32.2$ | | | |
| | $d_3 = 1.6$ | $nd = 1.0000$ | (Air) |
| $r_4 = -7.91$ | | | |
| | $d_4 = 0.95$ | $nd = 1.5927$ | $v = 35.8$ |
| $r_5 = +19.06$ | | | |
| | $d_5 = 1.55$ | $nd = 1.0000$ | (Air) |
| $r_6 = \infty$ | | | |
| | $d_6 = 1.6$ | $nd = 1.6563$ | $v = 57.29$ |
| $r_7 = -9.05$ | | | |
| | $d_7 = $ variable 10-15 | $nd = 1.0000$ | (Air) |
| $r_8 = +29.2$ | | | |
| | $d_8 = 3.3$ | $nd = 1.5890$ | $v = 48.64$ |
| $r_9 = -15.4$ | | | |
| | $d_9 = 1.22$ | $nd = 1.6513$ | $v = 38.33$ |
| $r_{10} = -47.09$ | | | |
| | $d_{10} = 4.35$ | $nd = 1.0000$ | (Air) |
| $r_{11} = -61.2$ | | | |
| | $d_{11} = 4.65$ | $nd = 1.6513$ | $v = 38.33$ |
| $r_{12} = -47.55$ | | | |
| | $d_{12} = 0.94$ | $nd = 1.5890$ | $v = 48.64$ |
| $r_{13} = +24.02$ | | | |
| | $d_{13} = 6.5$ | $nd = 1.0000$ | (Air) |
| $r_{14} = +18.5$ | | | |
| | $d_{14} = 2.0$ | $nd = 1.5168$ | $v = 64.2$ |
| $r_{15} = \infty$ | | | |

The distance $d_{10}$ between the lens groups 203 and 204 has at least the value of the diameter of the beam in this zone. The lens groups 203 and 204 of the attachment member 202 are adapted to be swivelled together about a transverse axis 212 through 180° and can be fixed in a 90° position in which the beam passes without restriction between them, so that these two groups of lenses may be switched out.

The objective 201 and the attachment member 202 are mounted in a housing consisting of a cylindrical portion 213 and a prismatic portion 214 which are firmly interconnected. The objective 201 and the attachment member 202 are mounted in the prismatic portion 214 pivotably through a least 180° about a transverse axis 215 by means of an actuating handle 216. The housing 213, 214 is mounted on the stationary frame of the apparatus in which the device is installed, so that they can be axially adjusted and the housing portion 213 has a thread 217, engaging into a nut (not shown), rotation of which permits the axial adjustment of the housing 213, 214. A handle 219 serves for the common pivoting of both lens groups 203 and 204 about the axis 212.

According to another embodiment, the housing of the objective 201 with the attachment member 202 can be dismantled as a unit from the apparatus and refitted in a position in which they are turned through 180°.

The function of this optical device is as follows: If the two groups of lenses 203 and 204 are withdrawn by rotation through 90°, the collector lens 205 with the objective 201 form in the image plane thereof a reduced image of the original on the left side. When the two groups of lenses 203 and 204 are turned through 90° in one direction, the object field diameter is increased by the factor $\sqrt{2}$ when they are turned in the opposite direction, it is reduced by the same factor, without changing the image diameter.

If the objective 201 and the attachment member 202 are swivelled as a unit about the axis 215 through 180°, and the two groups of lenses 203 and 204 are withdrawn, a magnified picture of the original is obtained, and when they are inserted into the beam path by rotating them through 90° in one or the other direction, one obtains, with constant image diameter, a widening and narrowing of the object field diameter by the factors of $\sqrt{2}$ and $0.5\sqrt{2}$, respectively.

When the whole optical system is moved by means of the thread 217 axially towards the image plane, the object field diameter becomes wider. A displacement in the opposite direction causes the object field diameter to become narrower. The axial displacement of the optical system shown amounts to 12.5 mm. and yields, with withdrawn attachment member, a change in the object field diameter of between 41.6 mm. and 256 mm. In both positions, the original is reproduced with a diameter of 24.7 mm.

In the system shown, the focus of the objective 201 is 25 mm. With this value of the focus, there results, with an object field diameter of 41.6 mm., a distance between the object plane and the image plane of about 107 mm., and with an object field diameter of 256 mm. a distance of about 312 mm.

For easy handling it is advantageous, if the housing 214 is rotatably about the optical axis, independently of a rotation of the cylindrical housing, by means of the grips 216 and 219, serving for the pivoting movement about the axis 215 and 212, respectively, and arranged on both sides of the housing.

The swivel movements of all members are defined by limited stops. The same also applies to the axial displacements in the whole system for changing the diameter of the object field. It is a special advantage that all these effects may be produced without having to detach optical members from the remaining elements.

According to another embodiment, the distance between the objective with attachment member and the apparatus may be changed by known means, e.g., by a spacer ring or a worm gearing. In this manner substantially smaller object field diameters may be detected with the same device, e.g., 2.39 mm. and may be magnified 10.4 times, so that the universal applicability of the optical device according to the invention is improved by simple means.

Instead of one collector lens 205 firmly mounted in the axis, there may be provided two lenses with different properties, which can be inserted into the beam of choice, according to whether the object field diameter is smaller or larger than the image field diameter of the objective 201, and whether the objective 201 or the two lens groups 203, 204 are nearer to the object field. In this case, during a transition from reduction to magnification, only the objective 201 and the two lens groups 203, 204 are turned through 180°.

In yet another embodiment, an objective designed for so-called close-ups at a distance of about 10 to 30 cm., and equipped with an attachment member, has, when adjusted to a position in which the original is reduced, an attachment member, correcting it to the so-called infinite position, and preferably swivel mounted to enable it to be swivelled out of the way. This imparts to the objective with attachment according to the invention an extraordinary range of variations of its object field (from about 1.7 to infinite).

In yet another embodiment, the attachment member is detachably connected with the objective. In this manner, also objectives of conventional construction can be subsequently equipped with attachment members, whereby the object field of the objective can be varied with constant distance between object and image planes.

The embodiments of the invention in which an exclusive property or privilege is claimed are defined as follows:

1. An optical device for projection, reproduction and viewing of planar objects, comprising in combination: a housing, a plane defined in the housing for receiving the object, a first image-forming optical system which is positioned closer to the object and a second image-forming optical system which is closer to the final image which is formed by the device, an intermediate image plane between said first and second image-forming optical systems on which both image-forming optical systems produce a real intermediate image, said intermediate image plane being stationary in the device, said first optical system having a part changeable to change the field diameter of the object, which diameter has been detected by the first optical system, at least one time by the factor $\sqrt{2}$, the distance of the plane of the object from the intermediate image plane and the position of the intermediate image plane relative to the plane of said final said image created by the second optical system remaining constant despite said change.

2. An optical device according to claim 1 in which the first optical system includes a portion changeable to change the field diameter of said final image created by the device in said final image plane at least one time by the factor $\sqrt{2}$.

3. An optical device according to claim 1, including at least one reflecting surface for deflecting said intermediate image produced by the first optical system and means moving said reflecting surface for producing a plurality of images placed side by side on said final image plane, at least one additional optical member being provided on the optical axis to correct for variations of image size and image sharpness resulting from path differences produced by the movable reflecting surface.

4. An optical device according to claim 1, including a further object, at least one reflecting surface which may be disposed in the optical path between the first and second optical systems and a third optical system disposed nearer the further object for transmitting the image thereof, which third optical system may be inserted in the optical path by moving said reflecting surface whereby images of the first mentioned and further objects may be produced on said image plane.

5. An optical device according to claim 1 including a further object, a reflecting surface movable into and out of the optical path between said first and second optical systems at said real intermediate image plane, a third optical system located nearer said further object and aligned with said reflecting surface when the latter is in said optical path for causing said reflecting surface to reflect the image of said further object from said third optical system through said second optical system and onto said final image plane.

6. An optical device comprising two optical parts each of which has an image-forming member, one of which, in operation, is disposed nearer an object and the other of which, in operation, is disposed nearer an image formed by the device, said optical parts being spaced apart so as to form a real intermediate image therebetween, the effective field diameter of one or both image-forming members being variable by alteration of at least one optical part by a step or steps of $\sqrt{2}$, said one image-forming member including an objective and an attachment member which consists of a lens combination with following specifications:

| Radius of curvature, mm. | Distance, mm. | Index of refraction | Abbé number |
|---|---|---|---|
| $r_1 = +12.7$ | $d_1 = 2.6$ | $nd = 1.6563$ | $v = 57.29$ |
| $r_2 = (-7.91$ | $d_2 = 0.8$ | $nd = 1.5638$ | $v = 60.76$ |
| $r_3 = -32.2$ | $d_3 = 1.6$ | $nd = 1.0000$ | (Air) |
| $r_4 = -7.91$ | $d_4 = 0.95$ | $nd = 1.5927$ | $v = 35.8$ |
| $r_5 = +19.06$ | $d_5 = 1.55$ | $nd = 1.0000$ | (Air) |
| $r_6 = \infty$ | $d_6 = 1.6$ | $nd = 1.6563$ | $v = 57.29$ |
| $r_7 = -9.05$ | $d_7 = $ variable 10-15 | $nd = 1.0000$ | (Air) |
| $r_8 = +29.2$ | $d_8 = 3.3$ | $nd = 1.5890$ | $v = 48.64$ |
| $r_9 = -15.4$ | $d_9 = 1.22$ | $nd = 1.6513$ | $v = 38.33$ |
| $r_{10} = -47.09$ | $d_{10} = 4.35$ | $nd = 1.0000$ | (Air) |
| $r_{11} = -61.2$ | $d_{11} = 4.65$ | $nd = 1.6513$ | $v = 38.33$ |
| $r_{12} = -47.55$ | $d_{12} = 0.94$ | $nd = 1.5890$ | $v = 48.64$ |
| $r_{13} = +24.02$ | $d_{13} = 6.5$ | $nd = 1.0000$ | (Air) |
| $r_{14} = +18.5$ | $d_{14} = 2.0$ | $nd = 1.5168$ | $v = 64.2$ |
| $r_{15} = \infty$ | | | | wherein $r_1$ to $r_{15}$ are radii of curvature of the consecutive lenses, $d_1$ to $d_{14}$ are the distances of the lens limiting surfaces measured in the optical axis, $nd$ is the refraction index of the individual optical members and $v$ is the abbé number, and wherein the values for $r_1$ to $r_{15}$ and $d_1$ to $d_{14}$ may be replaced by values which all differ from the given values by the same factor.

7. An optical device as claimed in claim 1, including a plurality of mirrors for deflecting the image produced by the first optical system, the said mirrors being mounted offset from one another on a rotatable shaft, rotation of the shaft causing said mirrors to be placed cyclically in the optical path whereby to produce a plurality of displaced images in said final image plane.

8. An optical device as claimed in claim 1, in which the diameter of the intermediate image plane is the geometric mean of two effective field diameters of the first optical system differing by at least once the factor of $\sqrt{2}$.

9. An optical device according to claim 1, including an objective having an attachment member, at least one part of which is movable between an operative and unoperative position and may be operative also being rotated through 180°.

10. An optical device according to claim 1, including a housing member, an objective and an attachment member, the objective being mounted, together with a part of the attachment member, in the housing member so as to be rotatable through 180° and being fixable in the 0° or 180° positions.

11. An optical device according to claim 1, including a housing member, an objective and an attachment member, the attachement member being mounted in the housing member so as to be rotatable through at least 90° about an axis lying at right angles to the optical axis of the device and comprising of two parts, each of which consists of at least one lens, and which are spaced apart so that the attachment member may be moved between an operative and inoperative position by rotation through an angle of at least 90°.

12. An optical device according to claim 1, including a housing member, an objective and an attachment member, the objective and attachment member mounted rotatably through 180° in the housing member and the attachment member having a pivotable part, means being provided to effect axial displacement of said housing member.

References Cited
UNITED STATES PATENTS

| | | | |
|---|---|---|---|
| 2,663,223 | 12/1953 | Hopkins | 350—184 |
| 2,906,172 | 9/1959 | Klemt | 350—18 UX |
| 1,236,722 | 8/1917 | Lange | 350—39 |
| 2,552,940 | 5/1951 | Cornut | 350—39 |
| 3,343,471 | 9/1967 | Mitchell | 350—9 UX |

FOREIGN PATENTS

| | | | |
|---|---|---|---|
| 1,547,345 | 10/1968 | France | 350—38 |

DAVID SCHONBERG, Primary Examiner

T. H. KUSMER, Assistant Examiner

U.S. Cl. X.R.

95—44; 350—33, 37; 352—140; 353—101; 355—55

UNITED STATES PATENT OFFICE
CERTIFICATE OF CORRECTION

Patent No. 3 671 098          Dated   June 20, 1972

Inventor(s)  Dr. Johann Rotter

It is certified that error appears in the above-identified patent and that said Letters Patent are hereby corrected as shown below:

Column 1, in the second line of the title, "INTERMEDIATE" should read ---INTERMEDIAL---. Column 14, line 53, "final said image" should read ---final image---. Column 15, line 30, "$r_2$=(-7.91" should read ---$r_2$= -7.91---.

Signed and sealed this 13th day of March 1973.

(SEAL)
Attest:

EDWARD M. FLETCHER, JR.           ROBERT GOTTSCHALK
Attesting Officer                 Commissioner of Patents